United States Patent [19]

Häuslein

[11] 4,162,054

[45] Jul. 24, 1979

[54] FILTERING DEVICE FOR PRODUCING EXTRACTS FROM COFFEE OR TEA

[75] Inventor: Reinhard Häuslein, Minden, Fed. Rep. of Germany

[73] Assignee: Melitta-Werke Bentz & Sohn KG, Minden, Fed. Rep. of Germany

[21] Appl. No.: 913,759

[22] Filed: Jun. 8, 1978

[51] Int. Cl.² ............ B01D 23/28; B65B 39/00; B67C 11/00
[52] U.S. Cl. .................................... 248/94
[58] Field of Search ............ 210/97, 143, 248, 258, 210/299, 307, 406, 416 R, 416 DW, 463, 473, 474, 477, 478, 479, 481, 483, 485; 99/295, 304, 306; 141/311 A; 222/416, 108, 189; 248/94

[56] References Cited

U.S. PATENT DOCUMENTS

| 992,021 | 5/1911 | Marzetti | 99/306 |
| 2,263,610 | 11/1941 | Cain | 99/306 |
| 3,092,012 | 6/1963 | Ruhnke | 222/416 |

OTHER PUBLICATIONS

Principles of Quantitative Analysis; Walter C. Blasdale; pp. 120–121.

Primary Examiner—Frank Sever
Attorney, Agent, or Firm—Spencer & Kaye

[57] ABSTRACT

A filter vessel arranged to receive a liquid-permeable filter bag for producing a coffee or tea beverage, the filter vessel having, at its bottom, a filtrate outlet in the form of a siphon which prevents dripping after completion of the filtering process.

5 Claims, 7 Drawing Figures

FILTERING DEVICE FOR PRODUCING EXTRACTS FROM COFFEE OR TEA

BACKGROUND OF THE INVENTION

The present invention relates to a filtering device for producing aromatic extracts from coffee or tea, which device is of the type that includes a filter vessel and a filter bag.

In known filtering devices of the above-mentioned type, the outlet of the filter vessel is in the form of one or a plurality of perforation bores at the lowest point of the filter vessel provided to assure complete emptying of the vessel.

If one or a plurality of outlet bores are disposed at the lowest point of the filter vessel there exists the drawback that upon completion of the filtering proces and after removal of the filtering device from the pot to receive the filtrate, any remaining filtrate will continue to drip outside of the pot and can soil the region around the pot. This is a particular drawback in coffeemakers in which the filtering device is suspended in the machine and remains there after completion of the filtering process since in such a case the remaining filtrate drips onto the surface of the warming plate of the coffeemaker, where it burns in, or scorches.

SUMMARY OF THE INVENTION

It is therefore an object of the present invention to prevent, with absolute certainty, dripping from a filtering device of the above-mentioned type after completion of the filtering process.

This and other objects are accomplished, according to the present invention, by giving the outlet of the filtering vessel the form of a siphon.

The invention thus assures discharge of the filtrate during the filtering process in a speedy and faultfree manner, and interruption of the stream of discharged filtrate in the final phase of the filtering process whereupon the remaining filtrate which may still accumulate can no longer pass through, so that dripping is no longer possible.

DESCRIPTION OF THE PREFERRED EMBODIMENTS

Figure 1:
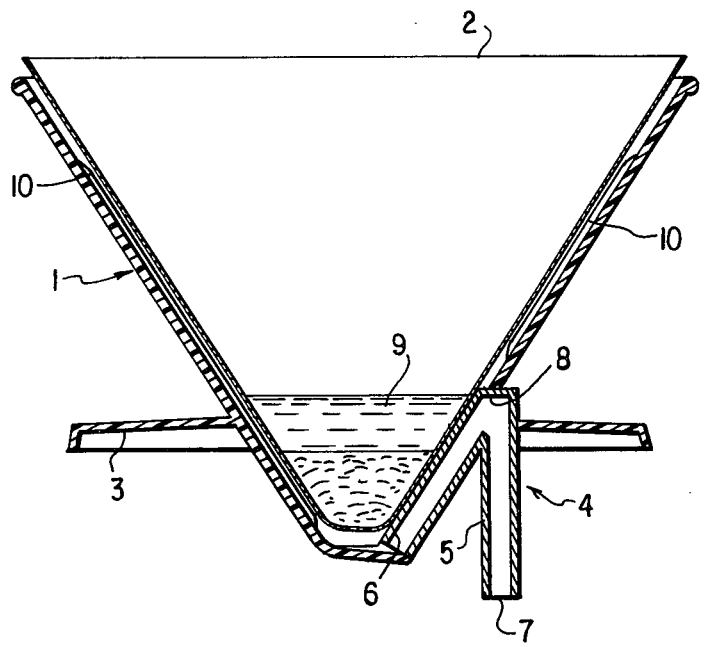
FIG. 1 is a cross-sectional view of a preferred embodiment of a filtering device according to the invention.

The embodiment of a filtering device according to the invention shown in FIG. 1 essentially includes a filter vessel, or holder, 1 and a filter bag 2 inserted thereinto. The filter vessel 1 is provided with a support edge 3 with which the filter vessel 1 can be placed onto a pot or other container.

The outlet 4 of the filter vessel 1 is designed, according to the present invention, as a siphon and, in the embodiment shown in FIG. 1, is formed by an angled pipe section 5 having a suction opening 6 disposed in the interior of the filter vessel 1 directly above the lowest point of the filter vessel 1 and an outlet opening 7 located at a lower level than the suction opening 6 outside the filter vessel 1. Thus filtrate can flow out of the filter vessel 1 in a siphoned manner if during the brewing process at least enough water has been poured into the vessel to bring the water level 9 to the upper deflection edge 8 of the angled piece of pipe section 5, i.e. to completely fill the bend in pipe section 5.

As long as enough liquid is present in the filtering device to keep the water level above line 9, filtrate will run through pipe section 5 into an underlying pot. Water flow will subsequently continue, according to the siphon principle until the water level descends to a point at which air can enter into the suction opening 6 of the pipe section 5, at which time the discharge of filtrate will be interrupted. This is the case when the liquid inside the filter vessel 1 has been drained almost completely so that upon completion of the filtering process remaining quantities of filtrate still seeping out of the filter bag 2 can no longer reach the outside.

Dripping is thus effectively and reliably prevented.

The arm of pipe section 5 extending into the interior of filter vessel 1 is flush with, or borders on a common plane with ribs 10 provided in the interior of filter vessel 1 to support the filter bag 2. Thus the positioning of the filter bag 2 is not interfered with by the arm of pipe section 5 protruding into the interior of the filter vessel 1.

Figure 2:
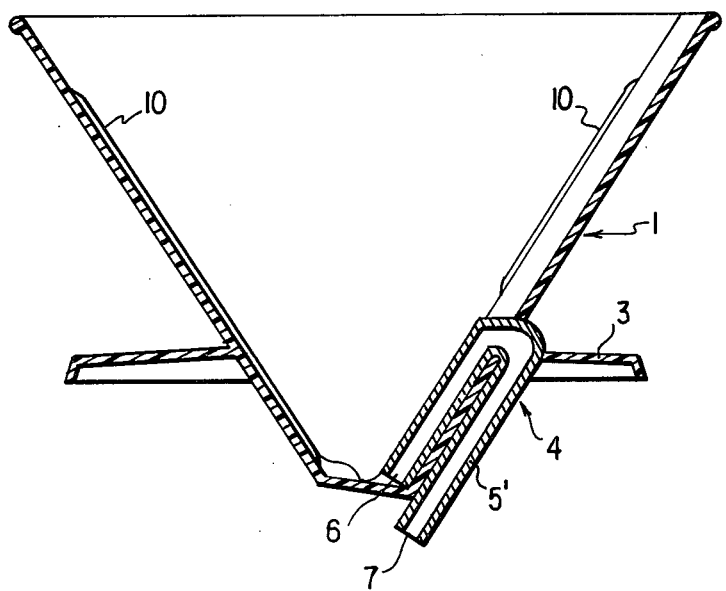
FIG. 2 is a view similar to that of FIG. 1 of a second embodiment of filter vessel according to the invention.

In FIG. 2, as in the succeeding figures, the filter bag is not shown. In the embodiment shown in FIG. 2 the outlet 4 is also a pipe section 5' which however has a distinct bend in it so that the discharge opening 7 comes to lie approximately in, or near, the center of the filter vessel 1. Otherwise the structure and operation of outlet 4 in the embodiment of FIG. 2 corresponds to that of the embodiment of FIG. 1.

Figure 3:
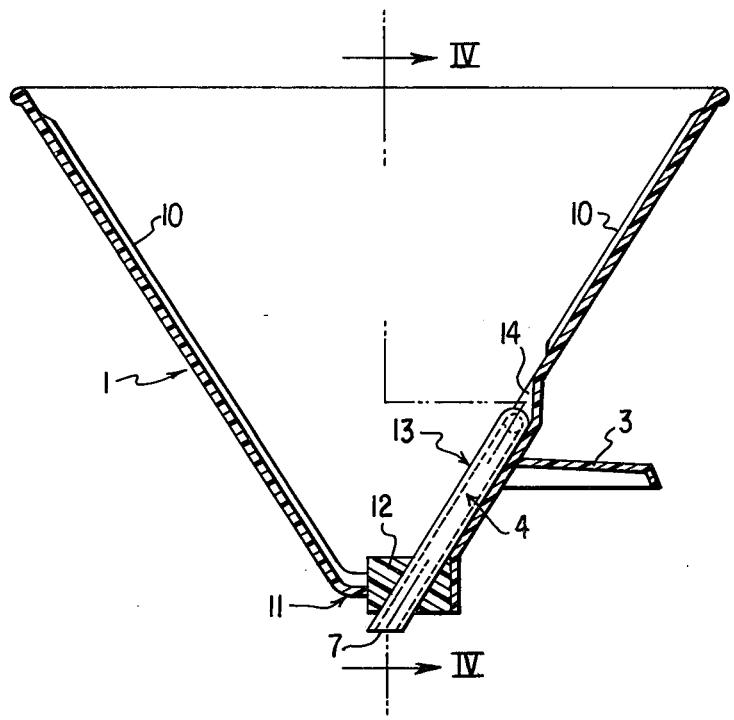
FIG. 3 is a view similar to that of FIG. 1 of a further embodiment of a filter vessel according to the invention.
Figure 4:
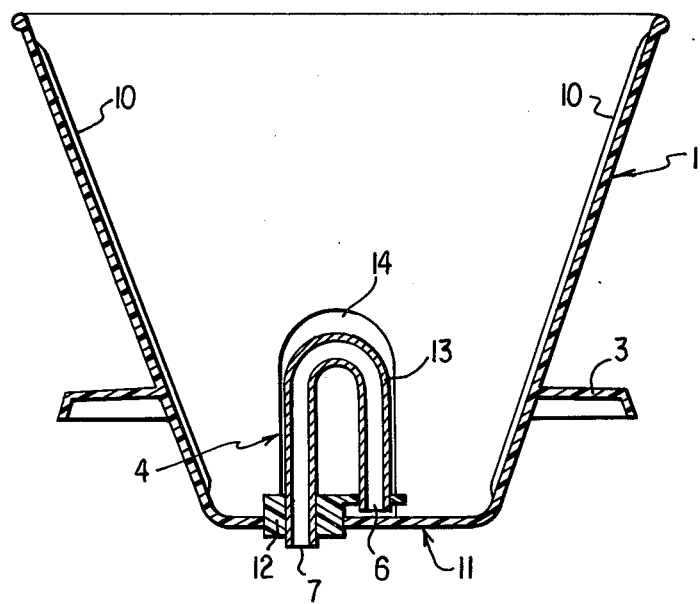
FIG. 4 is a cross-sectional view taken along the line IV—IV of FIG. 3.

FIGS. 3 and 4 show two views of an embodiment of the invention in which a shaped piece 12 is sealingly inserted into an opening in the filter vessel 1 in the area of its bottom 11. An approximately U-shaped bent piece of hose 13 is seated in the shaped piece 12 with its suction opening 6 again being disposed immediately above the lowest point in the interior of the filter vessel 1 and its outlet opening 7 lying outside of the filter vessel 1 near the axis thereof. The piece of hose 13 is disposed in a recess 14 in the filter vessel 1 and thus does not interfere with the secure seating of the inserted filter bag. In this embodiment of the invention as well, complete emptying of the filter vessel 1 results from the suction effect of the hose piece 13 which acts as a siphon and thus prevents dripping after completion of the filtering process.

A particular advantage of this embodiment is that, if required, the shaped piece 12 together with the piece of hose 13 can be removed from the filter vessel 1, which facilitates cleaning on the one hand and provides an opportunity, on the other hand, to use the filter vessel 1 as a normal filter if, for example, there is a defect in the piece 12 or the hose 13.

Figure 7:
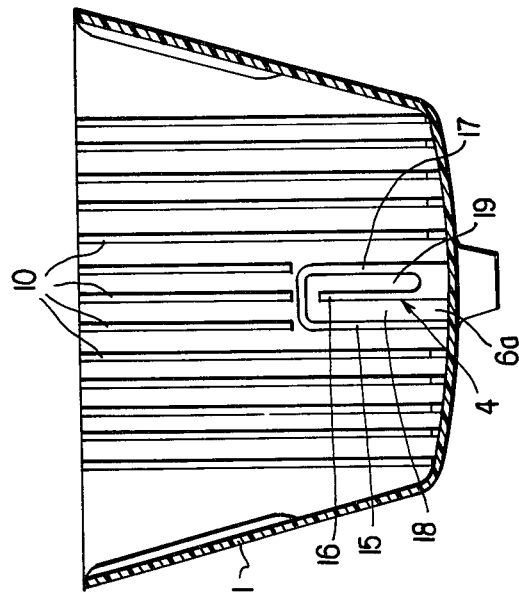
FIG. 7 is a cross-sectional view along the line VII—VII of FIG. 5.
Figure 6:
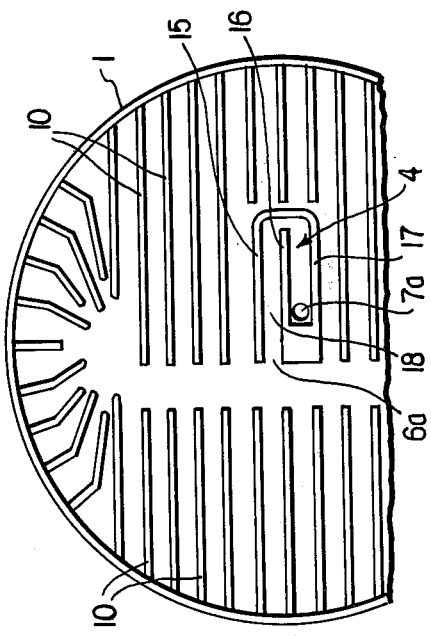
FIG. 6 is a frontal plan view in the direction of arrow VI of FIG. 5.
Figure 5:
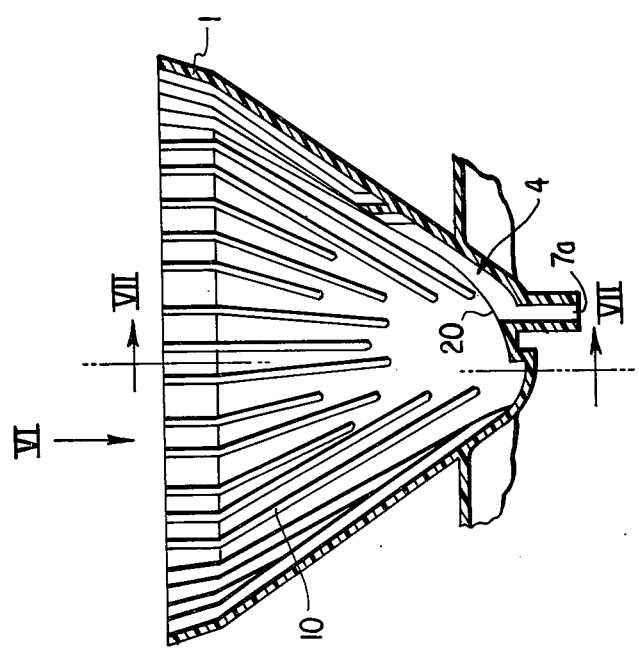
FIG. 5 is a cross-sectional view of a further embodiment of a filter vessel according to the invention.

A particularly advantageous embodiment of the invention is shown in FIGS. 5 through 7. In this embodiment the filter vessel 1 is made, as by molding, in one piece of plastic, the outlet 4 being formed by a system of channels delimited by guide ribs 15, 16 and 17 which project from the inner wall of filter vessel 1 toward the interior thereof.

Guide ribs 15, 16 and 17 form a channel section 18 extending from the suction, or inlet, opening 6a, which is disposed above the lowest point in filter vessel 1, and a further channel section 19 which leads downwardly toward the outlet opening 7a. Sections 18 and 19 communicate with one another at their upper ends. The surface of guide ribs 15, 16 and 17 which open toward the interior of filter vessel 1 has a rounded concave form 20, which is very clearly discernible in FIG. 5, and projects slightly higher than ribs 10, i.e. guide ribs 15 through 17 extend slightly further into the interior of the filter vessel than do ribs 10 which serve to support the filter bag.

As a result the filter bag will in any event rest securely against the guide ribs 15 through 17, particularly when water is introduced into the filtering device since then the filter bag becomes softer than in its dry state and, as a result of the pressure of the water and the weight of the ground coffee, is pressed against these guide ribs 15 through 17 in a practically sealing manner. Channel sections 18 and 19 which are defined by guide ribs 15 through 17 therefore define a conduit together with the contacting filter bag and again produce a pipe system which acts as a siphon.

This embodiment shown in FIGS. 5 through 7 is of advantage particularly from a process engineering point of view since this filter vessel, as already mentioned, can easily be produced of one-piece plastic in a one step operation. In practical use, a filter vessel 1 according to FIGS. 5 through 7 has the further great advantage that cleaning after completion of the filtering process is very easy.

It will be understood that the above description of the present invention is susceptible to various modifications, changes and adaptations, and the same are intended to be comprehended within the meaning and range of equivalents of the appended claims.

What is claimed is:

1. In a one-piece, molded, filter holder device for producing aromatic extracts from coffee or tea, including a filter vessel having an extract outlet and arranged to receive a filter bag, the improvement wherein said vessel is provided with an outlet opening in the vicinity of its bottom and said extract outlet comprises a plurality of guide ribs projecting from the interior wall of said vessel and defining a first channel section extending upwardly from a location spaced from said outlet opening and immediately adjacent the lowest point of the interior of said vessel, and a second channel section communicating at its lower end with said outlet opening, said first and second channel sections communicating with one another at their upper ends to form a conduit which is laterally open toward the interior of said vessel, said guide ribs being arranged to permit a filter bag inserted in said vessel to rest tightly thereagainst to close the laterally open side of said conduit and to enable said conduit to operate as a siphon, when the filter bag is filled with water, with the lower end of said first channel section defining a suction opening, whereby cleaning of all interior surfaces is facilitated.

2. Device as defined in claim 1 wherein said guide ribs are formed to present a concavely rounded surface located in the vicinity of the center of the base of said filter vessel.

3. Device as defined in claim 1 wherein said filter vessel is provided interiorly with additional ribs projecting toward its interior for supporting the filter bags and said guide ribs project slightly further into said vessel than do said additional ribs.

4. Device as defined in claim 1 wherein said guide ribs are integral with said vessel.

5. Device as defined in claim 1 wherein said extract outlet further comprises a member projecting upwardly from the interior of said vessel and located in the region of the bottom thereof between the lowest point of the interior of said vessel and said outlet opening for preventing direct flow of liquid therebetween.

* * * * *